US012717591B2

(12) United States Patent
Frachtenberg et al.

(10) Patent No.: US 12,717,591 B2
(45) Date of Patent: Aug. 25, 2026

(54) BENCHMARK PROGRAM OPTIMIZATION

(71) Applicant: Hewlett Packard Enterprise Development LP, Spring, TX (US)

(72) Inventors: Eitan Frachtenberg, Portland, OR (US); Pedro Henrique Rocha Bruel, San Jose, CA (US); Viyom Mittal, Milpitas, CA (US); Paulo Roberto Pereira de Souza Filho, Rio Grande do sur Brasil (BR)

(73) Assignee: Hewlett Packard Enterprise Development LP, Spring, TX (US)

( * ) Notice: Subject to any disclaimer, the term of this patent is extended or adjusted under 35 U.S.C. 154(b) by 72 days.

(21) Appl. No.: 18/665,446

(22) Filed: May 15, 2024

(65) Prior Publication Data

US 2025/0328355 A1 Oct. 23, 2025

(30) Foreign Application Priority Data

Apr. 19, 2024 (EP) .................................... 24305611

(51) Int. Cl.
*G06F 9/445* (2018.01)

(52) U.S. Cl.
CPC ................................ *G06F 9/44505* (2013.01)

(58) Field of Classification Search
CPC .................................................. G06F 9/44505
USPC ............................................................ 713/1
See application file for complete search history.

(56) References Cited

U.S. PATENT DOCUMENTS 5,655,148 A * 8/1997 Richman ............... G06F 13/102 710/9
6,219,639 B1 * 4/2001 Bakis ...................... G10L 17/10 382/116
6,336,108 B1 * 1/2002 Thiesson ................ G06N 5/025 704/256.4
6,421,453 B1 * 7/2002 Kanevsky ............. G06F 21/316 340/5.2
8,423,986 B1 * 4/2013 Grechanik .......... G06F 11/3676 702/179
8,639,839 B1 * 1/2014 Witkop ............... H04L 41/0886 709/221
8,781,990 B1 * 7/2014 De Alfaro ............. G06F 16/335 706/52
9,983,971 B1 * 5/2018 Yang ................... G06F 11/3428

(Continued)

OTHER PUBLICATIONS

Delimitrou et al., "Paragon: QoS-Aware Scheduling for Heterogeneous Datacenters", 2013, 12 pages.

(Continued)

*Primary Examiner* — Paul R. Myers
(74) *Attorney, Agent, or Firm* — Slater Matsil, LLP

(57) ABSTRACT

According to an implementation, a computer-implemented method to determine an optimal configuration of a benchmark program is proposed. The method includes iteratively selecting a unique parameter set from a parameter space, each parameter set corresponding to a unique configuration of the benchmark program; running the benchmark program as configured for each parameter set at least once; determining an evaluation score for each parameter set from one or more runs using an evaluation heuristic; recording an optimal parameter set having a best evaluation score; and configuring the benchmark program based on the optimal parameter set.

20 Claims, 3 Drawing Sheets

(56) References Cited

U.S. PATENT DOCUMENTS 10,349,876 B2 * 7/2019 Maierhofer ......... A61M 1/1609
2002/0065879 A1 * 5/2002 Ambrose .................. G06F 9/54 719/315
2002/0138443 A1 * 9/2002 Schran ................. G06Q 20/382 705/64
2002/0193979 A1 * 12/2002 Paterson ............. G06F 9/44505 703/22
2005/0060389 A1 * 3/2005 Cherkasova ............ H04L 65/80 709/220
2005/0097067 A1 * 5/2005 Kirshenbaum ....... G06F 18/254 706/46
2005/0121316 A1 * 6/2005 Molokov .................. C25C 7/06 204/229.8
2005/0131790 A1 * 6/2005 Benzschawel ........... G06N 3/02 705/35
2005/0138170 A1 * 6/2005 Cherkasova .......... H04L 41/145 709/225
2005/0257199 A1 * 11/2005 Johansson ................. G06F 8/61 714/E11.197
2007/0150254 A1 * 6/2007 Choi ....................... G06F 30/20 703/22
2008/0238767 A1 * 10/2008 Zhou ....................... G01S 5/011 342/357.73
2012/0268973 A1 * 10/2012 Tsai .......................... H02J 9/06 363/53
2014/0229607 A1 * 8/2014 Jung ..................... G06F 9/5072 709/224
2015/0107302 A1 * 4/2015 Kellner ..................... C03B 9/41 65/29.11
2015/0195018 A1 * 7/2015 Xiao ...................... H04B 7/063 375/267
2015/0363568 A1 * 12/2015 Milo ...................... G16H 50/30 705/2
2017/0199752 A1 * 7/2017 Cao ..................... G06F 11/3409
2018/0240041 A1 * 8/2018 Koch ..................... G06N 20/10
2019/0294519 A1 * 9/2019 Garg ................... G06F 11/3428
2019/0362422 A1 * 11/2019 Walker ................... G06Q 40/04
2021/0064690 A1 * 3/2021 Li .......................... G06N 20/00
2021/0167864 A1 * 6/2021 Razzell ............ H04B 10/25133
2022/0086211 A1 * 3/2022 Bull ........................ H04L 65/70
2023/0359922 A1 * 11/2023 Klimov .................. G06N 10/60
2024/0165634 A1 * 5/2024 Nagatani .................. G06N 3/09
2024/0248947 A1 * 7/2024 Sadeghi Esfahani ... G06F 17/11
2024/0281538 A1 * 8/2024 Radhakrishnan ....... G06F 21/57
2024/0303400 A1 * 9/2024 Tu ....................... G06F 11/3688
2025/0061354 A1 2/2025 Frachtenberg et al.

OTHER PUBLICATIONS

Delimitrou et al., "Quasar: Resource-Efficient and QoS-Aware Cluster Management", Mar. 1-5, 2014, 17 pages.
Jayaraman J et al., "Performance Optimality or Reproducibility: That is the Question", Nov. 17-22, 2019, 30 pages.

* cited by examiner

BENCHMARK PROGRAM OPTIMIZATION

BACKGROUND

Performance benchmark programs are helpful in various tasks, such as validation testing of machines within the same product line and product development, which involves comparing machines across different product lines. Given that these benchmark programs are run frequently and on a recurrent basis, the time it takes to complete them can affect the overall expense of these activities.

Further, modern computer systems exhibit a high level of non-determinism due to variabilities in hardware components, middleware, operating systems, and other contributing elements. This inherent nondeterminism can complicate accurate performance and power consumption measurements using the benchmark programs. Short-duration benchmark run time may yield inconsistent and difficult-to-decipher results due to the "noise" introduced by the system's variability. In contrast, an excessively lengthy benchmark run time can incur unwarranted expenses and delay development.

BRIEF DESCRIPTION OF THE DRAWINGS

Aspects of the present disclosure are best understood from the following detailed description when read with the accompanying figures.

Corresponding numerals and symbols in the figures generally refer to corresponding parts unless otherwise indicated. The figures are drawn to illustrate the relevant aspects of the disclosure clearly and are not necessarily drawn to scale.

DETAILED DESCRIPTION

The following disclosure provides many different examples for implementing different features. Specific examples of components and arrangements are described below to simplify the present disclosure. These are, of course, merely examples and are not intended to be limiting. Features from different implementations may be combined to form further implementations unless noted otherwise.

Various implementations are illustrated in the accompanying drawing figures, where the same reference number identifies identical components and elements, and repetitive descriptions are omitted for brevity. Variations or modifications described in one of the implementations may also apply to others. Further, various changes, substitutions, and alterations can be made herein without departing from the spirit and scope of this disclosure as defined by the appended claims.

Figure 1:
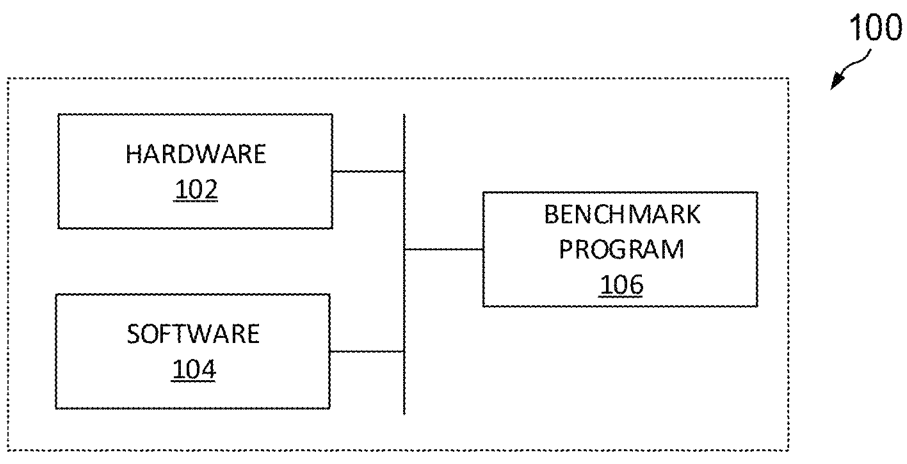
FIG. 1 is a block diagram of an example system.

FIG. 1 illustrates a block diagram of an example system 100, according to certain implementations. System 100 includes a hardware component 102, a software environment 104, and a benchmark program 106, which may (or may not) be arranged as shown. System 100 may include additional components that are not shown.

In implementations, system 100 is configured to run the benchmark program 106 to evaluate and measure the performance of various hardware and software configurations. In implementation, a computing device is implemented in system 100 as hardware component 102, used to execute benchmark program 106.

Hardware component 102 is configured to ensure minimal bottlenecks and maximal throughput during testing. Hardware component 102 may, for example, be implemented as a computing device. Hardware component 102 may include a multi-core, high-frequency processor, high-speed volatile memory (RAM), solid-state drives (SSD) for rapid data access, and an advanced graphics processing unit (GPU) if the benchmarking involves rendering or computing tasks that benefit from parallel processing. Additionally, system 100 may have a robust cooling solution to maintain optimal temperatures under heavy computational loads.

In implementations, software environment 104 includes an operating system supporting benchmark program 106, typically configured for maximum performance. Software environment 104 may include drivers and libraries updated to the latest versions to ensure compatibility and performance optimization for the hardware component 102.

In implementations, benchmark program 106 is chosen or designed to push the system's capabilities to their limits across various vectors, such as CPU performance, memory bandwidth, disk I/O, GPU performance, and overall system throughput. During a benchmarking process, the benchmark program 106 runs tests that provide scores or metrics reflecting, for example, the system's speed, stability, and efficiency under different loads and conditions. Advanced users or administrators may modify system settings like processor clock speeds, memory timings, and storage configurations to assess performance under various scenarios or to identify possible improvements.

In implementations, data is collected in real-time as the benchmark program 106 runs and is logged for subsequent analysis. This data might include raw numerical scores, system utilization statistics, thermal data, error rates, etc. Upon completing the benchmarking suite, analysis software within the system or operated by a user interprets the collected data, often comparing it to baseline performances or other standardized metrics.

The benchmark program 106 and the software environment 104 may also feature a feedback loop whereby the benchmark results inform system adjustments. For example, if a particular performance aspect is lacking, system 100 can be reconfigured or upgraded accordingly. In advanced setups, the optimization process can be automated with software that tweaks system settings dynamically in response to performance data.

Generally, benchmark programs are software utilized to ascertain various performance aspects of a computer system by producing metrics such as total run time, $99^{th}$-percentile latency, throughput, or any other pertinent performance metric. Benchmark programs can also be used to evaluate performance regression. Performance regression verifies whether a system's performance conforms to expectations and has not deteriorated or improved unexpectedly. For instance, benchmark programs are run when software changes are implemented or for hardware and configuration verifications to ensure no system performance declines. Comparing the current benchmark results with previous ones helps determine if the system's performance remains within an acceptable margin of error or whether further investigation is desired.

From a business perspective, running benchmark programs is central to developing software and hardware, providing insights into product performance compared to competitors. Benchmark results can influence decisions and actions across multiple divisions within a business, including sales—to showcase competitiveness, engineering—to confirm new product performance or integration, and manufacturing—to ensure a product meets performance standards before shipment. Since benchmark runs can be tied to substantial budget allocations across these areas, the ability to execute the benchmark program rapidly with credible outcomes presents an opportunity for considerable time and monetary savings.

For example, in compiler development, an objective is to evaluate whether the new compiler generates binaries that execute applications faster, considering the potential variability (referred to as "noise") inherent in performance measurement. Concurrently, assessing if there is an increase in compilation time-time spent translating source code into executable binaries is indispensable. In an ideal scenario, both the application's run time and the compilation time should be minimized. Nonetheless, inevitable trade-offs might be warranted. For instance, investing additional time in the compilation process could result in faster application run times due to more in-depth analysis and optimization phases, such as profile-guided optimization.

Aspects of this disclosure facilitate an exploration of the compiler parameters and the parameters within the code itself. Considering the strong likelihood of having thousands of code samples to validate, keeping each one within an optimal or minimal range concerning performance metrics is advantageous. Performance testing influences the time-to-market for new products due to its potentially lengthy duration. Advantageously, streamlining the performance testing phase through the disclosed optimization strategy enhances market responsiveness and competitiveness.

As another example, engineering simulation software platforms may include an extensive suite of many distinct products. Each product can embody a complex array of parameters and code paths, resulting in an intricate structure running into thousands of lines of code. When Independent Software Vendors (ISVs) aim to conduct performance regression tests to compare different software versions, they can encounter a time-consuming challenge.

Typically, performance regression tests are designed to ensure that new software versions do not cause a degradation in performance relative to previous versions. Completing these tests traditionally involves substantial time and financial resources, given the software products' extensive and complex nature. In this context, the capacity to execute benchmark runs optimized for minimal run times becomes advantageous. Such optimization enables ISVs to conduct regression tests more efficiently, fitting the process within practical timeframes and budget constraints. Therefore, the disclosed solutions for reducing benchmark execution time by optimizing the parameter space while maintaining accuracy and reliability are advantageous for manufacturers with many variables and an extensive codebase in their software products.

As yet another example, automotive engineers run hundreds of simulations weekly, a valuable endeavor for various aspects of vehicle design and function testing. Traditionally, automotive manufacturers have operated with high-performance computing (HPC) clusters but have recently started incorporating containerized workloads into their computing environment. Containerization adds a software layer to the process and can introduce performance variability, which can complicate the execution of simulations. This allows the establishment of benchmarks for how long a particular job should take when run on a given cluster, which factors in the expected performance and output of the HPC systems. Deviation from these established run times can raise concerns about the validity of the simulation results. If a job is not completed within the anticipated time frame, it can cast doubt on the reliability of the output, leading the automotive engineers to distrust the result.

Consequently, engineers can feel compelled to re-run the job to ensure accuracy, leading to increased computational costs and delays in development timelines. This example underscores the advantages of maintaining consistent and predictable performance in compute-intensive tasks such as simulations. Variability can also disrupt workflows and timelines, making solutions that can minimize or preempt such variabilities highly valuable to manufacturers, which depend on precision and reliability in their computing tasks.

In the era of 8-bit computing, performance modeling and evaluation for computer systems was relatively straightforward. For example, calculating the estimated run time for a loop was as simple as multiplying the number of assembly instructions within the loop by the total iterations and then dividing this figure by the processor's clock speed.

However, the landscape of system performance today is far more intricate and less predictable than it was in the past. Multiple elements bring a level of uncertainty to performance metrics. These include but are not limited to, the diversity of accelerators, multilevel network designs, architectures that support parallelism and concurrency, operating system heuristics, the complexity of software layered on top of the hardware, and disturbances originating from other concurrently running processes, particularly within shared environments such as cloud systems.

Accordingly, a significant challenge in performance measurement in modern systems is the inherent instability of the numbers obtained due to the complex interplay of hardware components, software, and external factors like network conditions. It is rare for consecutive performance measurements to yield identical results, with variances typically present. The difficulty lies in deciphering whether a difference in performance results is due to normal variance or whether the difference signifies an actual change in performance.

Previous approaches to resolve this uncertainty include extending the run time of the benchmark program, altering its parameters, or repeating the run several times to produce an average result. A shorter run might show results within the range of expected noise, making it impossible to discern the quality of those results. In contrast, a longer test duration can render such differences insignificant. A notable change, such as a five-second difference, would be easily identified under these extended conditions.

Executing benchmark programs for a sufficient period ensures statistical stability, where minor fluctuations fall into the noise category and do not significantly affect the outcome. For example, a discrepancy of half a second in one instance might be a random occurrence, but averaging over multiple runs could reveal that the actual difference is merely 0.001 second, indicating no significant change. Accordingly, when detecting performance regressions, benchmark programs are typically configured to run long enough for any random variations to become insignificant.

For example, in machine validation, rather than attempting to mitigate variability through repeated testing, benchmark programs are typically extended until the relative impact of noise falls below a certain acceptable level. The machine's performance is compared against established metrics for the same hardware configuration before deployment, and further investigation is warranted if the performance does not meet the expected levels.

Nevertheless, excessively long benchmark run time can hinder the validation process by causing delays in production readiness. In contrast, an overly brief benchmark run time can result in false negatives due to the aforementioned variability. Consequently, it is beneficial to balance benchmark run time—optimizing it to be neither too long nor too short. Adjusting the parameters of the benchmark program, such as problem size, can help manage its length without altering its outcome.

Typically, benchmark programs come equipped with various parameters influencing their duration and stability. The collective range of these configurable options is called the parameter space. By adjusting these parameters, the benchmark run time and the stability of its results can be manipulated.

For example, in a benchmark program to assess graphics card performance, the parameter space may include, for example, pixel number, frame resolution, or bits per pixel. In this example, after the benchmark run, the software outputs a metric, such as frames per second.

A method is proposed to automatically pinpoint the optimal duration for running benchmark programs, striving for an equilibrium between resource efficiency and statistical significance in performance evaluation. By integrating search strategies within the parameter space with statistical techniques for measuring uncertainty, a dual-goal optimization is implemented to lower the execution time and fluctuations of the benchmark program.

Aspects of this disclosure introduce a suite of methodologies for navigating through this parameter space to identify an ideal configuration—that is, a specific combination of parameter values—which yields a benchmark run time that is adequately brief to conserve resources yet sufficiently extensive to reveal statistically meaningful distinctions in performance.

The disclosure can be viewed as a compendium of techniques for exploring the parameter space. Multiple strategies are proposed for this exploration, each varying in efficiency. The detailed methods do not dictate how these variations should be implemented; instead, they focus on the exploratory process within the parameter space to discover the optimal set of parameters. The optimal set ensures that a single benchmark run is adequately stable to satisfy established statistical thresholds.

The proposed optimization leverages heuristics in parameter-space exploration, rendering the process more efficient than standard approaches. An integral part of this strategy includes employing automated statistical techniques to evaluate the stability and effectiveness of different points within the parameter space, which are indicative of various configurations of the benchmark program. The approach offers a broad spectrum of control options for various user preferences, from fully automated operations to manual customization and fine-tuning for more precise control.

In contrast to the standard solutions, which primarily aim at predicting, eliminating, or reducing variability, the proposed approach strives to reduce the evaluation time of online operations without compromising the reliability that might be jeopardized due to high variability. While preceding methodologies focus on system parameters, the present disclosure focuses on application parameters. Further, the proposed strategy incorporates automated statistical models and methods to ascertain the stability of the optimal configuration of the benchmark program.

Figure 2:
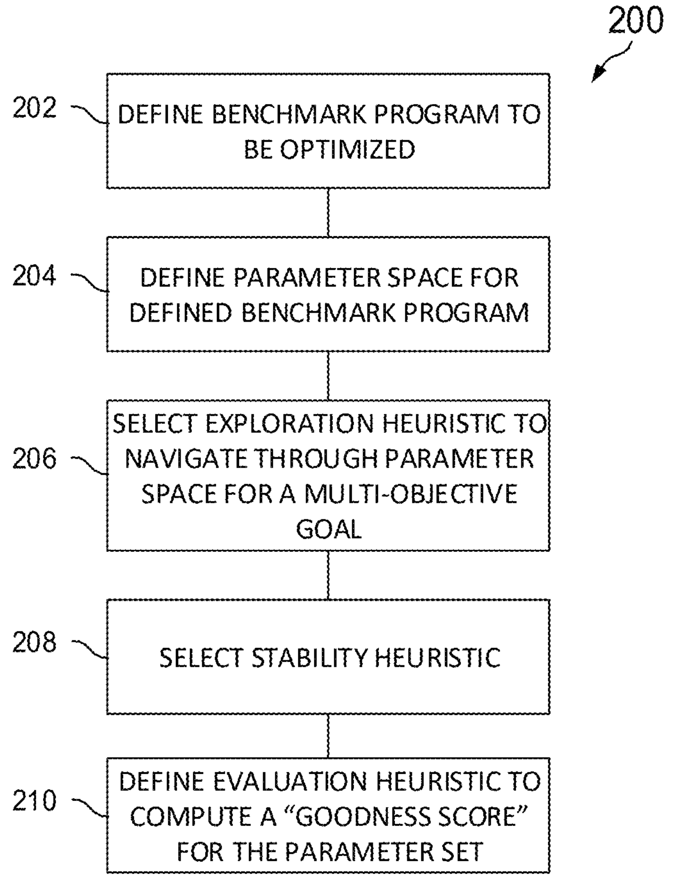
FIG. 2 is a flow chart of an example method for defining the optimization criterion to optimize the configuration of a benchmark program.

FIG. 2 illustrates a flow chart of an example method 200 for defining the optimization criterion to optimize the configuration of a benchmark program, according to certain implementations. The initial step in optimizing a benchmark program involves defining the program and detailing the parameters of interest that will be explored. It is noted that one or more steps outlined in the flow chart of method 200 can be optional. Further, changes to the arrangement of the steps, removal of one or more steps and path connections, and addition of steps and path connections are similarly contemplated.

At step 202, the benchmark program to be optimized is defined, which allows one to, at step 204, define the parameter space for the corresponding benchmark program. The parameters of the parameter space represent adjustable elements that can be manipulated to influence the benchmark performance, stability, or a combination thereof.

The parameter space can be categorized into several types, such as categorical parameters, which include a list of predefined values of any kind like strings (e.g., bouncing ball or kite-in-the-air test provided by the benchmark program); discrete parameters, which are numerical and specified by a start point, end point, and incremental step size (e.g., resolution); and continuous parameters, which are also numerical but outlined by a start and end point (e.g., number of frames).

It should be noted that the parameter space does not require each defined type, and any combination or subset (e.g., single parameter) of the defined types is contemplated in various implementations.

At step 206, once the parameter space is established at step 204, an exploration heuristic (i.e., criterion or search strategy) is selected to navigate effectively through the parameter space for a multi-objective goal. The heuristic choice may vary based on the nature of the parameter space, and various strategies can be used to determine the exploration heuristic. For example, the exploration heuristic might be a random configuration, the configuration that yields the fastest known performance, or another predefined criterion.

The exploration heuristic can be, for example, a full grid search, a random search, a binary search, or search strategies inspired by natural processes (non-limiting). Each variation of the exploration heuristic offers distinct advantages, and the choice among them depends on the specific scenario, including the nature of the benchmark program, computational limitations, and the desired level of precision in results.

A full grid search provides an exhaustive strategy systematically evaluating every possible combination of multi-dimensional points within the parameter space. The search process can be organized in different ways, from the fastest predicted performance to the slowest, or vice versa, depending on which end of the spectrum one expects to find the optimal points.

In the random search, a random point in the parameter space is selected for evaluation with the qualification that points within the parameter space previously selected are not chosen for subsequent iterations. This approach is typically less systematic than a full grid search, but it is often faster and can yield good results in areas where the optimal points are distributed sporadically.

A binary search is a more targeted strategy than a random or entire grid search that is efficient when dealing with a parameter space with a single, non-categorical parameter (i.e., discrete or continuous). Binary search halves the parameter space recursively, quickly homing in on the optimal range.

Genetic algorithms (GA), evolutionary computation techniques, and simulated annealing are examples of search strategies inspired by natural processes. These strategies are typically used for larger, more complex parameter spaces and can effectively traverse large search areas by mimicking biological evolution, for example.

In implementations, regularization techniques and gradient descent can be applied to the selected exploration heuristic to minimize the size of the parameter space during the benchmark program's optimization.

Regularization techniques are typically used to introduce penalties for larger sets of parameters to prevent overfitting, effectively streamlining the search process. Overfitting occurs when the optimization is negatively impacted by the noise or random fluctuations during the optimization process rather than the underlying points to be analyzed, resulting in poor optimization results.

Combining gradient descent with the selected exploration heuristic (e.g., genetic algorithms) for cases involving continuous parameters can help refine the point selection by exploiting the directional cues inherent in gradient information. For discrete parameters, local search methods can be beneficial. These approaches start with an initial solution and progressively explore neighboring points in the parameter space, seeking local improvements to arrive at an optimal configuration.

At step 208, a stability heuristic (i.e., convergence criterion) for assessing parameter set stability is selected. This ensures that multiple benchmark runs with the selected parameters of the parameter space consistently produce similar results.

Generally, for a single parameter set, multiple benchmark runs are executed to account for, for example, inherent variability in the system performance when running benchmark programs. For example, recognizing that noise intrinsic to the system can lead to inconsistent results, a single execution of a benchmark program may not reliably indicate its actual performance. Therefore, conducting several runs can help mitigate the effects of such variability, providing a more robust and accurate assessment by averaging the outcomes or identifying trends across the multiple runs. Sometimes, a single run may be sufficient to achieve stability; accordingly, multiple runs are not required for each parameter set. Performing these evaluations iteratively is undertaken offline to facilitate an expeditious and efficient benchmarking procedure when executing the benchmark program for its intended purposes.

A fixed, predetermined number of runs for each set of parameters is set in one implementation. This approach relies on defining the total number of iterations in advance, possibly based on statistical or empirical requirements, to ensure enough data is collected.

Another approach sets a specific time limit, during which the runs are continuously conducted with the same parameters until the predetermined duration elapses. This time-bound strategy emphasizes temporal constraints and may be tailored for real-time data processing or time-sensitive evaluations.

A different approach employs the stability heuristic whereby runs are conducted repeatedly but cease once the measurements demonstrate that the stability heuristic is achieved. This adaptive approach aims to optimize data collection efficiency by terminating runs when additional iterations are unlikely to yield significant new information.

In some implementations, these approaches are combined. For example, an optimization protocol might operate with a preset duration for runs yet still conclude early if the results achieve stability as defined by a threshold metric beforehand. This hybrid approach allows for flexible termination based on temporal limits and data stability, thereby enhancing the overall efficiency of the testing process.

When multiple factors influence the number of runs—such as time constraints and stability considerations—the approach can adapt dynamically, potentially leading to resource savings and targeted data collection strategies. These variations cater to different practical scenarios and can be strategized to balance rigor against other constraints like time or computational resources.

Various statistical tests can be utilized to determine whether enough benchmark runs are completed for a single parameter set before a predetermined duration. Examples of statistical tests for convergence include but are not limited to evaluating a normalized standard error of a mean, determining whether a distribution fits an expected analytical distribution, determining whether a distribution diverges from a previously recorded empirical distribution, using a percentage-based measurement criterion, or an auto-stop rule.

In implementations, if the multiple benchmarks do not produce stability within a predetermined duration, the selected parameters from the parameter space are determined to be unstable. Accordingly, at the end of each run of the multiple benchmark runs for the selected parameters, the stability heuristic is utilized to determine whether stability is achieved. If stability is achieved within the predetermined duration, the benchmark runs for the selected parameters are completed. If stability is not achieved, the benchmark program is again run for the same parameter set, or if the predetermined duration has been exhausted, the parameter set is determined to be unstable and excluded from being a possible configuration for the benchmark program.

For example, if the normalized standard error of the mean for the results of multiple runs of a single set of parameters (i.e., the selected point within the parameter space) for an iteration of method 200 falls below a predetermined threshold, and the mean is normally distributed due to the central limit theorem, it is possible to infer convergence (i.e., stability). In implementations, the predetermined threshold is about 5%. As the sample size grows, the standard error decreases, reducing the normalized standard error of the mean, which eventually dips below the predetermined threshold.

An alternative method for assessing convergence involves examining the distribution of each result from the multiple benchmark runs for a parameter set (i.e., point), for instance, whether it is Gaussian or bimodal, and if it aligns with a previously recorded empirical distribution using, for example, the Kolmogorov-Smirnov (K-S) test. If the difference between the two distributions (i.e., the distribution of the results for the current benchmark run and the empirical distribution) is determined to diverge below a predetermined threshold, convergence can be assumed.

For illustration, a benchmark program is executed on a baseline graphics card 1000 times, resulting in a specific distribution pattern for the results and providing the recorded empirical distribution. A new graphics card to be benchmarked can be executed with a parameter set during the optimization process until the distribution of the result of the benchmark run for the parameter set for the new graphics card appears sufficiently similar-a criterion that is explicitly defined—to that of the baseline. In that case, it can be concluded that the benchmark run associated with the parameter set for the new graphics card is statistically reliable.

As another example, convergence can be assumed if the expected analytical distribution (i.e., theoretical distribution) of benchmark results and the distribution of the benchmark result for a benchmark run from the multiple benchmark runs for a single parameter set show a close resemblance.

Another test to determine convergence is a percentage-based measurement. For example, the multiple benchmark runs for a single parameter set are halted (convergence is deemed to have occurred) when N % of the runs are at least M % as fast as the baseline run, where N and M are configurable values. For example, if 90% of the benchmark runs are at least 95% as fast as the baseline, convergence can be inferred. It is possible that when a single run is conducted that performs as quickly as the reference, there is a risk of erroneously concluding that the system has met the performance threshold. This may lead to prematurely ending the testing process without sufficient data to confirm consistent performance. Accordingly, in embodiments, a minimum number of benchmark runs is established to ensure the reliability of the results.

An auto-stop rule can also be used to determine convergence and pre-emptively terminate the benchmark runs for a single parameter set based on the satisfaction of a particular statistical criterion. The auto-stop rule can be advantageous in settings with limited resources or when time efficiency is paramount. An implementation of the auto-stop rule is disclosed, for example, in U.S. patent application Ser. No. 18/450,102, titled "Automated Determination of Stopping Conditions in Online Experiments," which is incorporated by reference herein in its entirety.

U.S. patent application Ser. No. 18/450,102 addressed the issue of determining the appropriate amount of repetition needed for an experiment to yield stable outcomes and extracting significant performance metrics in scenarios with variability in benchmarks. U.S. patent application Ser. No. 18/450,102 maintains the original settings of the benchmark without altering benchmark parameters to affect the length of each run and minimize the relative impact of noise within a single test. The benchmark is executed multiple times for a single parameter set to handle variability. Although this approach allows the benchmark to retain its inherent noise, control over variability is achieved by averaging performance across these multiple executions.

Accordingly, U.S. patent application Ser. No. 18/450,102 proposes a benchmark test for which a baseline may not exist; it could be a new application, or the parameters are fixed. The goal of repeatedly running the benchmark is to determine a point at which the results are statistically stable. U.S. patent application Ser. No. 18/450,102 provides one or more methods that enable the benchmark to automatically terminate once the data meets a criterion of statistical stability, thus ensuring efficiency in terms of minimizing resource utilization. This optimal stopping point provides reliable results without being resource-intensive.

Implementations of the present disclosure do not employ repetitive runs for the benchmark program in the field (i.e., online)—even though repeated runs are an option during the benchmark program's optimization (i.e., offline, training phase, etc.) process. In contrast to U.S. patent application Ser. No. 18/450,102, the present disclosure manages the variability within the parameters of a single benchmark run, thereby reducing or eliminating a number of iterations to achieve reliable data, potentially including only a single iteration. However, in an implementation, the present disclosure proposes using the auto-stop rule defined, for example, in U.S. patent application Ser. No. 18/450,102 to determine stability without exceeding a predetermined duration during the optimization of the benchmark program.

Generally, the selection of the stability heuristic depends on the use case and what is promised to the business. For example, suppose a search engine company conducts performance benchmarks on its search engine. In that case, it is aware that response times exceeding one second for any query can result in significant financial losses. Consequently, the search engine company may establish stability criteria stipulating that there is a 99.9% likelihood that any instance where a search takes more than a second to produce results is a genuine occurrence rather than an anomaly or minor deviation. This stability criterion ensures that sustained delays are not dismissed as mere statistical noise but are acknowledged as genuine performance issues requiring attention.

At step 210, an evaluation heuristic for computing each set of parameters' "goodness score" is defined based on, for example, the run time (i.e., average run time, shortest run time, etc.) and one or more statistical properties. The evaluation heuristic creates a single metric based on predetermined criteria for the defined benchmark program.

In implementations, an evaluation heuristic amalgamates (i.e., merges, combines, integrates) various factors associated with measurements from multiple benchmark runs for a single parameter set into a singular value. This singular value facilitates a comparative analysis for parameter sets within the parameter space. This comparison makes it possible to discern the most optimal set of parameters from the parameter space, which can be designated as the optimal configuration for the benchmark program. This configuration is optimal in implementations because it yields the most favorable outcome according to the heuristic's calculated goodness metric. In implementations, the goodness score is a positive value.

In implementations, the evaluation heuristic may be used to determine a stability convergence to end multiple runs with the same parameter set and to compare the performance of each parameter set to choose the optimal configuration of the benchmark program.

In implementations, the evaluation heuristic may be used to compare the performance of each parameter set to determine the optimal configuration of the benchmark program, and, for example, a predetermined value is used to set the number of benchmark runs for a single parameter set.

Myriad points exist within the parameter space under consideration, each representing a unique set of conditions. Method 200 proposes an optimization search to determine a benchmark program's optimal point within the parameter space. Each point within the parameter space can vary in stability, with some meeting the criteria for stability and others not. Assuming a binary classification distinguishes points as stable or unstable, the focus of the evaluation heuristic shifts to the subset of stable points.

In an implementation, convergence (i.e., stability) can be inferred by running multiple benchmark runs for each point within the parameter space and recording the cumulative run time until stability is achieved within a predetermined duration. The cumulative time can be used as the evaluation metric (i.e., goodness score) for that point. At the exhaustion of the parameter space, the cumulative run time to achieve stability for points with stable results is evaluated, and the point having the shortest cumulative run time is selected as the optimal set.

In an implementation, the goodness score or the evaluation heuristic corresponds to a desirability metric. For example, a desirability metric can be associated with the variance of the outputs for the different runs using a single parameter set within the parameter space. An example of such desirability metric is $$e^{-VAR(T)\times\frac{\sum T}{n}},$$

where VAR is the variance function, Σ is the sum function, T is the set of run times of the benchmark program for a single parameter set, n is the number of runs for the single parameter set. A similar desirability metric can be calculated for each parameter set.

As another example, a desirability metric can be associated with the Kurtosis of the outputs for the different runs using a single parameter set within the parameter space. Generally, a high kurtosis signifies a greater risk of outliers than a high standard deviation. Kurtosis is a statistical measure that describes the shape of a distribution's tails compared to the normal distribution, indicating the presence of outliers and the peaked-ness of the data set. An example of such desirability metric is $$e^{-KURT(T)\times\frac{\sum T}{n}},$$

where KURT is the kurtosis function, Σ is the sum function, Tis the set of run times of the benchmark program for a single parameter set, n is the number of runs for the single parameter set. A similar desirability metric can be calculated for each parameter set.

In implementations, the parameter set having the highest desirability metric is used as the optimal set. In implementations, the desirability metric is calculated after each run, and stability can be inferred in response to the desirability metric exceeding a predetermined threshold.

In an implementation, the goodness score or the evaluation heuristic corresponds to a Sharpe ratio. The Sharpe ratio is a financial metric that evaluates the risk-adjusted performance of an investment by calculating the excess return per unit of risk, where the excess return is the difference between the investment's expected return and the risk-free rate, and risk is measured by the standard deviation of the investment's returns.

An example of such metric is an inverse Sharpe ratio or $$\frac{1}{SD(T)\times\sum T},$$

where SD is the standard deviation function, Σ is the sum function, and Tis the set of run times of the benchmark program for a single parameter set. A similar desirability metric can be calculated for each parameter set. In implementations, the parameter set having the highest inverse Sharpe ratio is used as the optimal set. In implementations, the inverse Sharpe ratio is calculated after each run, and stability can be inferred in response to the desirability metric falling below a predetermined threshold.

Accordingly, the "goodness" metrics furnish systematic and measurable ways to vet and rank different stable parameter configurations in implementations. This enables an impartial choice regarding which parameter set best refines benchmarking efficiency across diverse goals and viewpoints. The effectiveness of a configuration can be gauged by considering the duration of the run time, its stability, or a combination thereof, which varies according to the specific priorities of the entity conducting the benchmark program.

For instance, if an organization incurs significant costs when running extensive benchmark programs, it may emphasize reducing the run time rather than optimizing stability. In such cases, the run time is assigned a higher weight in the evaluation process. Conversely, if enduring stability is paramount, the organization might prioritize it over the run time, leading to a different weighting in the assessment.

Accordingly, this allows for a weighted function that evaluates multiple objectives to determine the optimal, best, or superior configuration based on the organization's unique requirements and priorities. Stability evaluation does not need to be reduced to a binary judgment of stable or unstable, as the weighted function allows for more nuanced assessments by considering the relative stability compared to the run duration. Using this approach, systems can be characterized as more stable or less stable rather than merely labeling them in absolute terms. An example of this nuanced measurement is the width of the confidence interval, which can serve as a metric for stability. Unlike binary evaluations, the confidence interval provides a continuous measurement scale, enabling a more detailed and graduated understanding of stability across a range.

Figure 3:
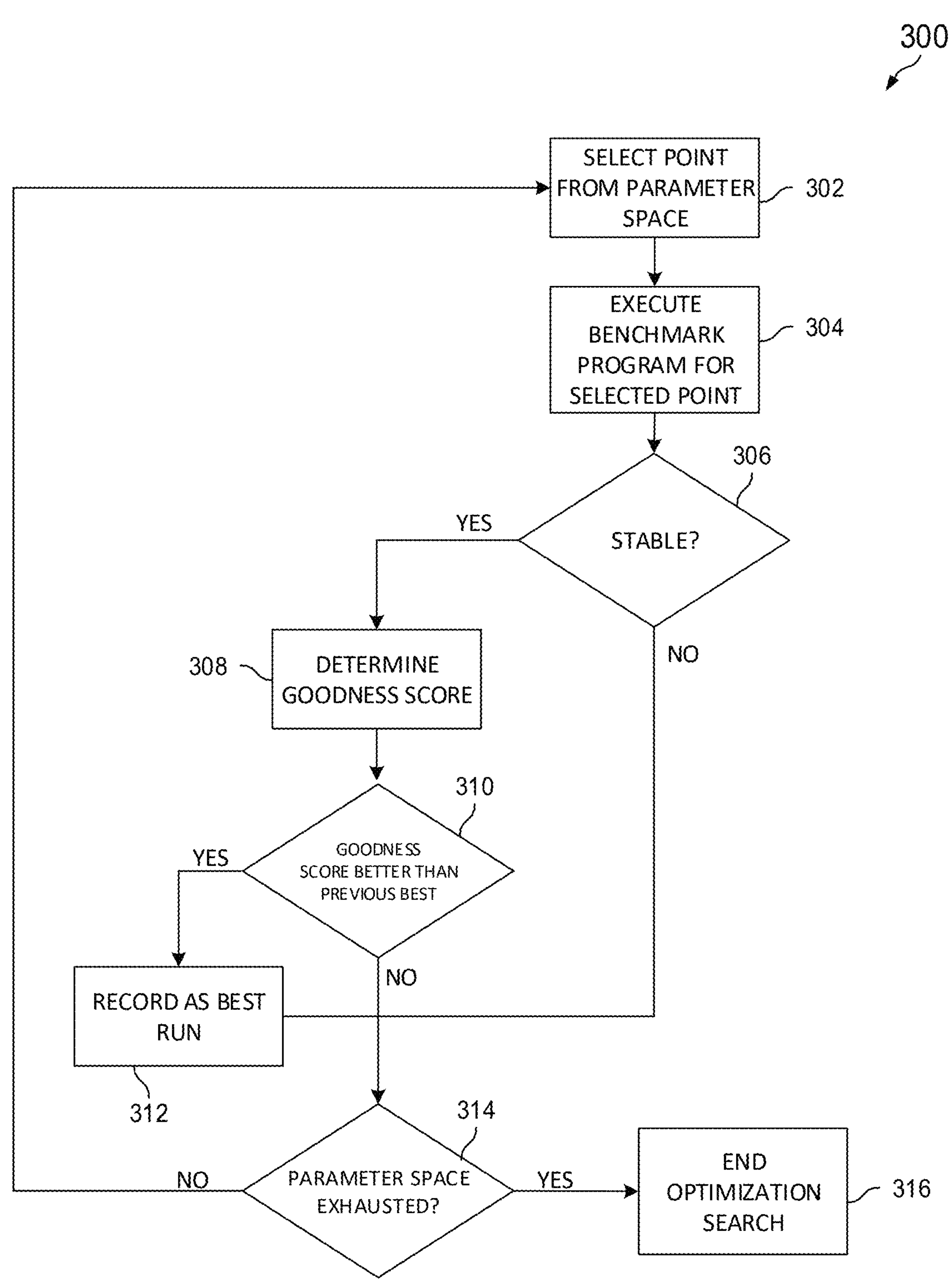
FIG. 3 is a flow chart of an example method for optimizing a benchmark program.

FIG. 3 illustrates a flow chart of an example method 300 for optimizing a benchmark program, according to certain implementations. Once the benchmark program and parameter space are defined and the optimization criteria are determined using method 200, method 300 automatically selects the optimal set within the parameter space. This ensures that a single benchmark run is adequately stable to satisfy established statistical thresholds. It is noted that one or more steps outlined in the flow chart of method 300 can be optional. Further, changes to the arrangement of the steps, removal of one or more steps and path connections, and addition of steps and path connections are similarly contemplated.

At step 302, a point selection is made from the parameter space of the benchmark program based on the exploration heuristic selected at step 206 of method 200. This chosen point represents a single-dimensional point or a combination of parameters (multi-dimensional point) within the parameter space that defines a specific benchmark program configuration. For example, for a benchmark program with three parameters within its defined parameter space, the point selection assigns an acceptable value based on each parameter's parameter type (i.e., categorical, discrete, or continuous).

For instance, dealing with a categorical parameter would involve selecting one of the available categories. In the case of a continuous parameter, a particular value would be chosen from within an allowable range. Similarly, one of the specified discrete options would be selected for a parameter described by discrete values.

The assigning values to the respective parameters allow for their subsequent application as input to the benchmark program. Further, it enables performance evaluation, such as determining the run time associated with those values.

At step 304, the benchmark program is executed utilizing the selected point from the parameter space chosen in step 302. The execution of the benchmark program is carried out, for example, either for a set period (i.e., predetermined duration), a set number of benchmark runs, until a certain level of stability is reached based on the stability heuristic established earlier in step 208 of method 200, until a certain desirability score is achieved or ruled out, or a combination thereof (e.g., stability achieved before predetermined duration).

Subsequently, at step 306, if the execution demonstrates stable results based on the stability heuristic, an analysis is undertaken to evaluate the run quality at step 308 using the evaluation heuristic defined at step 210 of method 200. This evaluation integrates various factors, such as the stability value and run time, among other relevant criteria, into a holistic multi-objective metric. The outcome of this assessment yields a "goodness score," essentially a grade quantifying the performance. In implementations, the goodness score for a stable result is recorded for the parameter set.

At step 310, the goodness score for the current run is compared to the previously best goodness score (i.e., the most optimal result for previous parameter sets) recorded.

In an implementation, the goodness score of a stable run for a point is a positive value greater than zero. In embodiments, a goodness score of an unstable run for a point has zero value. A positive goodness score is not necessary for a run to be stable; however, if it distinguishes stable runs from unstable ones and can act as a metric for assessing the relative optimality of a run in comparison to others, it can offer significant value.

In embodiments, a goodness score associated with a first point within the parameter space having a value higher than a second goodness score associated with a second point within the parameter space is a more optimal point.

For example, a first point in the parameter space has a goodness score of 12, a second point in the parameter space has a goodness score of 15, and a third point in the parameter space has a goodness score of 0. In this example, the first and second points are stable runs because they are non-zero values, whereas the third point is unstable because it has a value of zero. Second, the second point is more optimal than the first point because it has a higher goodness score.

At step 312, should the goodness score for the current run surpass the score of all prior evaluations, the goodness score and the associated point within the parameter space are recorded as the most optimal result.

At step 314, a determination is made as to whether the parameter space is explored (i.e., exhausted). Various strategies can be utilized to identify whether the parameter space is explored, thereby assisting in deciding when to conclude the optimization process. In implementations, the parameter space is explored in response to all points within the parameter space being thoroughly evaluated (i.e., the search space is completely covered). In an implementation, the parameter space is explored in response to method 300 running after a predetermined duration. In an implementation, the parameter space is explored in response to a predetermined number of parameter sets selected at step 302. In an implementation, the parameter space is explored in response to the goodness score exceeding a predetermined threshold.

At step 316, the optimization process ends in response to the parameter space being determined to be sufficiently explored. At this point, the parameter or set of parameters associated with the best "goodness score" is identified and reported as the best (i.e., most optimal) point within the parameter space. This marks the successful completion of the benchmark program's optimization process.

Alternatively, suppose the goodness score for the current run at step 310 is determined to be less than (i.e., less optimal) than the previously recorded best goodness score. In that case, the goodness score is not recorded (for reporting purposes, although it may be recorded and utilized as part of the guiding process of the parameter-space exploration heuristic) for the parameter or set of parameters and the method skips step 312 and transitions to step 314. Further, if the execution of the benchmark program at step 306 is determined to be an unstable run, a goodness score of zero is assigned to the selected point; the method skips step 306 through step 312 and transitions directly to step 314.

For example, if the current point in the parameter space has a goodness score of 12, whereas the previous point had a goodness score of 15, the goodness score for the current point is not recorded for reporting purposes. However, if the current point in the parameter space has a goodness score of 15, whereas the previous point had a goodness score of 12, the goodness score for the current point is recorded for reporting purposes. The run is unstable if the current point in the parameter space has a goodness score of zero.

If, at step 314, the determination is made that the parameter space is not sufficiently explored, the method transitions back to step 302, and a selection is made from the parameter space of the benchmark program (not previously selected).

In an implementation, the result of the previous run informs the parameter space search criterion for the next run. For example, in cases where the exploration heuristic is not based on simple random selection, the loop emphasizes reevaluation in light of new information based on the "goodness score" recorded.

The iterative process is repeated until the method determines that the parameter space is sufficiently explored at step 314, and the optimization process is terminated at step 316. The iterative process is repeated until no further improvements are found, until a budget time for optimal searching has been exceeded, or all parameters have been examined.

The proposed optimization strategy for benchmark programs differs from standard solutions by determining the optimal run time for a benchmark program to control and evaluate variability rather than attempting to eliminate it. Acknowledging and effectively managing the inherent variability, the proposed optimization technique provides a more refined and realistic method of optimizing benchmark performance.

A distinct advantage of this solution is its automation, eliminating the need for manual intervention in the optimization process. This allows for efficiency and objectivity in finding the best settings as the system systematically navigates and evaluates the parameter space based on predefined heuristics and metrics. Moreover, the proposed optimization strategy demonstrates a high degree of flexibility. It accommodates various heuristics for exploring parameter spaces and evaluating stability. This flexibility ensures that the solution can be adapted to multiple benchmark programs, accommodating diverse requirements in testing environments.

An advantage of the proposed approach is the significant decrease in benchmark execution time while maintaining high statistical reliability. This improvement in efficiency leads to potential cost savings across various business units by reducing the overall budget allocated for benchmark executions. Additionally, better time management and reliability achieve heightened trust in benchmark results.

Secondary advantages include Quality of Service (QOS) enhancements and adherence to Service Level Agreements (SLAs) from reduced or eliminated performance variability. The execution of multi-node applications like Bulk Synchronous Processing (BSP) is optimized, facilitating closely timed completion across nodes. The proposed approach also aids in detecting abnormal hardware configurations and recommending optimal hardware setups for future iterations. Moreover, the suggested approach simplifies data processing for energy-aware scheduling by correlating node sensor data with application execution.

Figure 4:
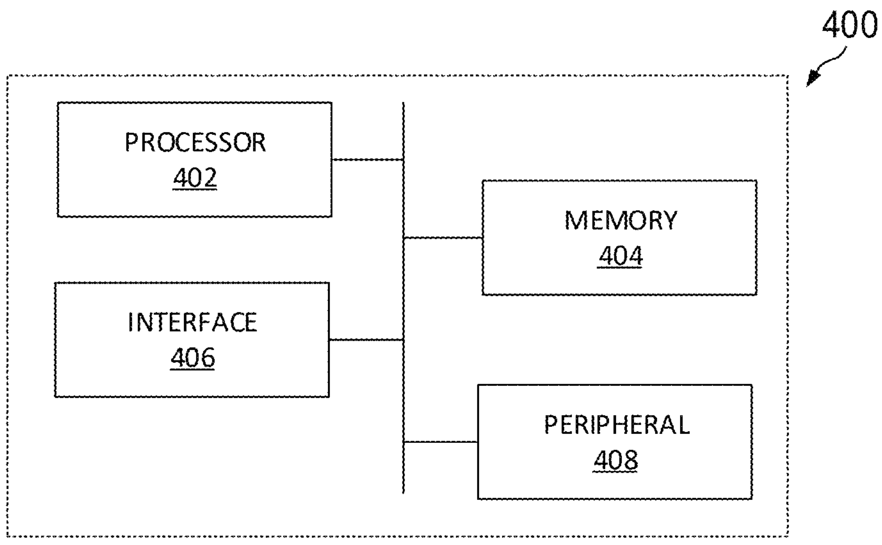
FIG. 4 is a block diagram of an example computing device.

FIG. 4 illustrates a block diagram of an example computing device 400, according to certain implementations. The implementations described herein can be implemented using computing devices. Computing device 400 includes a processor 402, a memory 404, an interface 406, and a peripheral 408, which may (or may not) be arranged as shown. Computing device 400 may include additional components that are not shown. For example, computing device 400 may include a power supply to provide power to the computing device 400.

Computing device 400 can be, for example, a server (e.g., a blade-server in a blade-server chassis, a rack server in a rack, etc.), a desktop computer, a mobile device (e.g., laptop computer, smartphone, personal digital assistant, tablet computer, automobile computing system, or any other mobile computing device), a storage device (e.g., a disk drive array, a fiber channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), an Internet of Things (IoT) device, an array of nodes of computing resources, a supercomputing device, a data center or any portion thereof, or a digital sensor. In implementations, any or all of the aforementioned can be combined to create a system of such devices or partitioned into separate logical devices, collectively called computing device 400. Other types of computing devices may be used without departing from the scope of implementations described herein.

In an implementation, processor 402 is an integrated circuit, a single-core processor, a microcontroller, or a multi-core processor for processing instructions. Processor 402 may be a general-purpose processor configured to execute program code included in software executing on computing device 400. Processor 402 may be a special-purpose processor where instructions are incorporated into the processor design. Although one processor 402 is shown in FIG. 4, computing device 400 may include any number of processors without departing from the scope of implementations disclosed herein. In implementations, the benchmark program is configured to provide a metric associated with the processor 402.

In an implementation, memory 404 is volatile memory, non-volatile memory, or both. In implementation, memory 404 is a random-access memory (RAM), cache memory, persistent storage, a hard disk, an optical drive, flash memory, or the like. In an implementation, memory 404 includes a data repository for storing data structures storing any amount of data (e.g., information). In implementation, a data repository is any type of storage unit or device (e.g., a file system, database, collection of tables, RAM, or any other storage mechanism or medium) for storing data. Further, the data repository may include multiple different storage units or devices. The multiple storage units or devices may or may not be the same type or located at the exact physical location. In implementations, memory 404 is configured to store instructions to be executed by processor 402 to perform the methods disclosed herein.

In an implementation, interface 406 is a touchscreen, a keyboard, a mouse, a microphone, a touchpad, an electronic pen, a motion sensor, or any other input device. implementations, interface 406 is a screen (e.g., a liquid crystal display (LCD), a plasma display, a touch screen, a cathode ray tube (CRT) monitor, a projector, or other display device), a printer, external storage, or any other output device. Interface 406 may allow a user to interact with computing device 400. In implementation, interface 406 is an input and an output device. Interface 406 may be locally or remotely coupled to the processor 402, memory 404, and peripheral 408. Many different types of computing devices exist, and the aforementioned interface 406 may take other forms. In some instances, multimodal systems can allow a user to provide multiple interfaces to communicate with computing device 400.

In an implementation, interface 406 may facilitate coupling computing device 400 to a network (not shown) (e.g., a local area network (LAN), a wide area network (WAN) such as the Internet, mobile network, or any other type of network) or to another device, such as another computing device. Interface 406 may perform or facilitate receipt or transmission of wired or wireless communications using wired or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 1G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

In an implementation, interface 406 may be a Global Navigation Satellite System (GNSS) receiver or transceiver used to determine the location of computing device 400 based on receiving one or more signals from one or more satellites associated with GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement. Therefore, the basic features here may easily be substituted for improved hardware or firmware arrangements as they are developed.

Methods described herein can be implemented using computer-executable instructions stored in memory 404 or otherwise available from computer-readable media. Such instructions can include, for example, instructions and data that cause or otherwise configure processing devices, a computer, a special-purpose computer, or a processing device to perform a particular function or group of functions.

Portions of computer resources used can be accessible over a network. The computer-executable instructions may be, for example, binaries and intermediate format instructions such as assembly language, firmware, source code, etc. Examples of computer-readable media that may be used to store instructions, information used, or information created during methods according to described examples include magnetic or optical disks, flash memory, USB devices provided with non-volatile memory, networked storage devices, or the like.

In implementation, peripheral 408 is one of the interface components previously disclosed concerning interface 406. For example, peripheral 408 is a printer, a scanner, an external storage device, a monitor, a graphics card, a keyboard, or a mouse. In implementations, a benchmark program is used to gauge the performance of the peripheral 408, specifically tailored to test particular aspects of the peripheral's functionality. For example, a printer's performance can be assessed by measuring print speed, resolution, color accuracy, and consistency across multiple tasks; a graphics card is tested for frame rates, rendering capabilities, and resolution support in graphically intensive scenarios; and storage devices are benchmarked for read/write speeds, access times, and data transfer rates under various file operation conditions.

In implementations, computing device 400 is configured to execute a benchmark program on a component coupled (wired or wirelessly) to the computing device 400 to determine the performance of the component or the computing device 400. In an implementation, computing device 400 or multiple computing devices such as computing device 400 is configured to execute a benchmark program on a component, components, another computing device, or multiple computing devices.

All or any portion of the components of computing device 400 may be implemented in circuitry. For example, the components can include or can be implemented using electronic circuits or other electronic hardware, which can include one or more programmable electronic circuits (e.g., microprocessors, GPUs, DSPs, CPUs, or other suitable electronic circuits) or can include or be implemented using computer software, firmware, or any combination thereof, to perform the various operations described herein. In some aspects, computer-readable storage devices, mediums, and memories can include a cable or wireless signal containing a bit stream and the like.

Figure 5:
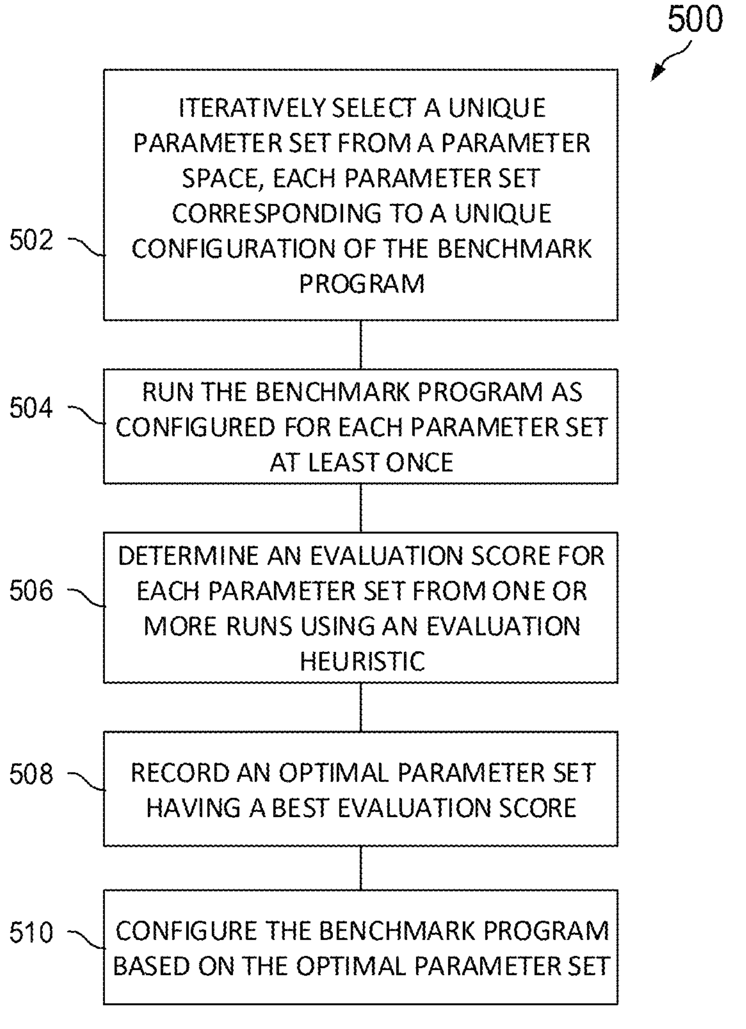
FIG. 5 is a flow chart of an example method for optimizing the benchmark program.

FIG. 5 illustrates a flow chart of an example method 500 for optimizing the benchmark program, according to certain implementations. It is noted that one or more steps outlined in the flow chart of method 500 can be optional. Further, changes to the arrangement of the steps, removal of one or more steps and path connections, and addition of steps and path connections are similarly contemplated. Method 500 can be implemented as a computer-implemented method, as computer instructions stored in a non-transitory computer-readable media, or programming instructions to be executed by a processor stored in a non-transitory memory in a computing device.

At step 502, a unique parameter set from a parameter space is iteratively selected. Each parameter set corresponds to a unique configuration of the benchmark program. In implementations, each parameter set in the parameter space is a categorical, a discrete, or a continuous type of parameter. In implementations, iteratively selecting the unique parameter set from the parameter space comprises selecting values based on the parameter type.

In implementations, iteratively selecting the unique parameter set from the parameter space includes selecting the unique parameter set using an exploration heuristic. The exploration heuristic can be a full grid search, a random search, a binary search, an evolutionary computational search, a genetic algorithm search, or a simulated annealing search. In implementations, a regularization, a gradient descent, or a combination thereof, is applied to the exploration heuristic to select the unique parameter set for each iteration.

At step 504, the benchmark program is run as configured for each parameter set at least once. In implementations, the number of runs for each parameter set is determined based on a stability heuristic, a predetermined number of runs, a predetermined duration for the one or more runs, or a combination thereof.

In implementations, the stability heuristic is based on a comparison of a normalized standard error of the mean of results for one or more runs to a threshold, a comparison of a distribution of results for one or more runs to an expected analytical distribution, a comparison of the distribution of results for one or more runs to an empirical distribution, determining that N % of the benchmark runs are at least M % as fast as a baseline, determining a termination point based on an auto-stop rule, or a combination thereof.

At step 506, an evaluation score for each parameter set from one or more runs is determined using an evaluation heuristic. In implementations, the evaluation score is based on a shortest run time for each parameter set for the one or more runs, based on a highest desirability metric, based on a highest kurtosis metric, based on the highest inverse Sharpe ratio metric, or a combination thereof.

In an implementation, the goodness score of a stable run for a point is a positive value greater than zero. In embodiments, a goodness score of an unstable run for a point has zero value. A positive goodness score is not necessary for a run to be stable; however, if it distinguishes stable runs from unstable ones and can act as a metric for assessing the relative optimality of a run in comparison to others, it can offer significant value.

In embodiments, a goodness score associated with a first point within the parameter space having a value higher than a second goodness score associated with a second point within the parameter space is a more optimal point.

For example, a first point in the parameter space has a goodness score of 12, a second point in the parameter space has a goodness score of 15, and a third point in the parameter space has a goodness score of 0. In this example, the first and second points are stable runs because they are non-zero values, whereas the third point is unstable because it has a value of zero. Second, the second point is more optimal than the first point because it has a higher goodness score.

At step 508, an optimal parameter set with the best evaluation score is recorded. Accordingly, the best evaluation score associated with the points of the parameter space having a stable run is selected, and its associated evaluation score is recorded as the optimal parameter set. For example, continuing with the previous example, if the second point has the highest goodness score amongst all stable points within the parameter space, the second point and its associated parameter set are recorded as the parameter set having the best evaluation score.

Once at step 508, the optimal parameter set with the best evaluation score is recorded, at step 510, the benchmark program is configured based on the optimal parameter set. For example, continuing with the previous example, the benchmark program is configured based on the parameter set associated with the second point. The benchmark program is now ready to benchmark software and hardware according to the most optimal configuration, as disclosed herein.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular implementations described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding implementations described herein. Accordingly, the appended claims are intended to include processes, machines, manufacture, compositions of matter, means, methods, or steps within their scope.

Accordingly, the specification and drawings are to be regarded simply as an illustration of the disclosure as defined by the appended claims, and are contemplated to cover any and all modifications, variations, combinations, or equivalents that fall within the scope of the present disclosure.

The foregoing outlines features of several examples so that those skilled in the art may better understand the aspects of the present disclosure. Various modifications and combinations of the illustrative examples and other examples will be apparent to persons skilled in the art upon reference to the description. Therefore, the appended claims are intended to encompass any such modifications.

A first aspect relates to a computer-implemented method to determine an optimal configuration of a benchmark program. The method includes iteratively selecting, by a computer system, a unique parameter set from a parameter space, each parameter set corresponding to a unique configuration of the benchmark program; running, by the computer system, the benchmark program as configured for each parameter set at least once; determining, by the computer system, an evaluation score for each parameter set from one or more runs using an evaluation heuristic; recording, by the computer system, an optimal parameter set having a best evaluation score; and configuring, by the computer system, the benchmark program based on the optimal parameter set. For example, the first aspect is implemented in accordance with the method 500 of FIG. 5.

In a first implementation form of the computer-implemented method according to the first aspect as such, running the benchmark program as configured for each parameter set at least once includes determining a number of runs for each parameter set based on a stability heuristic, a predetermined number of runs, a predetermined duration for the one or more runs, or a combination thereof. For example, the first implementation of the first aspect is implemented in accordance with step 504 of method 500.

In a second implementation form of the computer-implemented method according to the first aspect as such or any preceding implementation form of the first aspect, the stability heuristic is based on a comparison of a normalized standard error of the mean of results for one or more runs to a threshold, a comparison of a distribution of results for one or more runs to an expected analytical distribution, a comparison of the distribution of results for one or more runs to an empirical distribution, determining that N % of benchmark runs are at least M % as fast as a baseline, determining a termination point, or a combination thereof. For example, the second implementation of the first aspect is implemented in accordance with step 506 of method 500.

In a third implementation form of the computer-implemented method according to the first aspect as such or any preceding implementation form of the first aspect, iteratively selecting the unique parameter set from the parameter space includes selecting the unique parameter set using an exploration heuristic, the exploration heuristic being a full grid search, a random search, a binary search, an evolutionary computational search, a genetic algorithm search, or a simulated annealing search. For example, the third implementation of the first aspect is implemented in accordance with step 502 of method 500.

In a fourth implementation form of the computer-implemented method according to the first aspect as such or any preceding implementation form of the first aspect, the computer-implemented method further includes applying regularization, gradient descent, or a combination thereof, to the exploration heuristic to select the unique parameter set for each iteration. For example, the fourth of the first aspect implementation of the first aspect is implemented in accordance with step 206 of method 200.

In a fifth implementation form of the computer-implemented method according to the first aspect as such or any preceding implementation form of the first aspect, the evaluation score is based on a shortest run time for each parameter set for the one or more runs, based on a highest desirability metric, based on a highest kurtosis metric, based on a highest inverse Sharpe ratio metric, or a combination thereof. For example, the fifth implementation of the first aspect is implemented as step 210 of method 200.

In a sixth implementation form of the computer-implemented method according to the first aspect as such or any preceding implementation form of the first aspect, each parameter set in the parameter space is a categorical, a discrete, or a continuous type of parameter. Iteratively selecting the unique parameter set from the parameter space includes selecting values based on the parameter type. For example, the sixth implementation of the first aspect is implemented in accordance with step 202 of method 200.

A second aspect relates to a non-transitory computer-readable media storing computer instructions to determine an optimal configuration of a benchmark program that, when executed by a processor, causes the processor to iteratively select a unique parameter set from a parameter space, each parameter set corresponding to a unique configuration of the benchmark program; run the benchmark program as configured for each parameter set at least once; determine an evaluation score for each parameter set from one or more runs using an evaluation heuristic; record an optimal parameter set having a best evaluation score; and configure the benchmark program based on the optimal parameter set. For example, the second aspect is implemented in accordance with the method 500 of FIG. 5.

In a first implementation form of the non-transitory computer-readable media according to the second aspect as such, running the benchmark program as configured for each parameter set at least once includes determining a number of runs for each parameter set based on a stability heuristic, a predetermined number of runs, a predetermined duration for the one or more runs, or a combination thereof. For example, the first implementation of the second aspect is implemented in accordance with step 504 of method 500.

In a second implementation form of the non-transitory computer-readable media according to the second aspect as such or any preceding implementation form of the second aspect, the stability heuristic is based on a comparison of a normalized standard error of the mean of results for one or more runs to a threshold, a comparison of a distribution of results for one or more runs to an expected analytical distribution, a comparison of the distribution of results for one or more runs to an empirical distribution, determining that N % of benchmark runs are at least M % as fast as a baseline, determining a termination point, or a combination thereof. For example, the second implementation of the second aspect is implemented in accordance with step 506 of method 500.

In a third implementation form of the non-transitory computer-readable media according to the second aspect as such or any preceding implementation form of the second aspect, iteratively selecting the unique parameter set from the parameter space includes selecting the unique parameter set using an exploration heuristic, the exploration heuristic being a full grid search, a random search, a binary search, an evolutionary computational search, a genetic algorithm search, or a simulated annealing search. For example, the third implementation of the second aspect is implemented in accordance with step 502 of method 500.

In a fourth implementation form of the non-transitory computer-readable media according to the second aspect as such or any preceding implementation form of the second aspect, the computer instructions, when executed by the processor, cause the processor to apply regularization, gradient descent, or a combination thereof, to the exploration heuristic to select the unique parameter set for each iteration. For example, the fourth of the second aspect implementation of the first aspect is implemented in accordance with step 206 of method 200.

In a fifth implementation form of the non-transitory computer-readable media according to the second aspect as such or any preceding implementation form of the second aspect, the evaluation score is based on a shortest run time for each parameter set for the one or more runs, based on a highest desirability metric, based on a highest kurtosis metric, based on a highest inverse Sharpe ratio metric, or a combination thereof. For example, the fifth implementation of the second aspect is implemented as step 210 of method 200.

In a sixth implementation form of the non-transitory computer-readable media according to the second aspect as such or any preceding implementation form of the second aspect, each parameter set in the parameter space is a categorical, a discrete, or a continuous type of parameter. Iteratively selecting the unique parameter set from the parameter space includes selecting values based on the parameter type. For example, the sixth implementation of the second aspect is implemented in accordance with step 202 of method 200.

A third aspect relates to a computing device to determine an optimal configuration of a benchmark program. The computing device includes a non-transitory computer-readable storage media configured to store programming instructions; and a processor coupled to the non-transitory computer-readable storage media, wherein the programming instructions, when executed by the processor, cause the processor to: iteratively select a unique parameter set from a parameter space, each parameter set corresponding to a unique configuration of the benchmark program, run the benchmark program as configured for each parameter set at least once, determine an evaluation score for each parameter set from one or more runs using an evaluation heuristic, record an optimal parameter set having a best evaluation score, and configure the benchmark program based on the optimal parameter set. For example, the third aspect is implemented in accordance with the method 500 of FIG. 5.

In a first implementation form of the computing device according to the third aspect as such, running the benchmark program as configured for each parameter set at least once includes determining a number of runs for each parameter set based on a stability heuristic, a predetermined number of runs, a predetermined duration for the one or more runs, or a combination thereof. For example, the first implementation of the third aspect is implemented in accordance with step 504 of method 500.

In a second implementation form of the computing device according to the third aspect as such or any preceding implementation form of the third aspect, the stability heuristic is based on a comparison of a normalized standard error of the mean of results for one or more runs to a threshold, a comparison of a distribution of results for one or more runs to an expected analytical distribution, a comparison of the distribution of results for one or more runs to an empirical distribution, determining that N % of benchmark runs are at least M % as fast as a baseline, determining a termination point based, or a combination thereof. For example, the second implementation of the third aspect is implemented in accordance with step 506 of method 500.

In a third implementation form of the computing device according to the third aspect as such or any preceding implementation form of the third aspect, iteratively selecting the unique parameter set from the parameter space comprises selecting the unique parameter set using an exploration heuristic, the exploration heuristic being a full grid search, a random search, a binary search, an evolutionary computational search, a genetic algorithm search, or a simulated annealing search. For example, the third implementation of the third aspect is implemented in accordance with step 502 of method 500.

In a fourth implementation form of the computing device according to the third aspect as such or any preceding implementation form of the third aspect, the evaluation score is based on a shortest run time for each parameter set for the one or more runs, based on a highest desirability metric, based on a highest kurtosis metric, based on a highest inverse Sharpe ratio metric, or a combination thereof. For example, the fourth of the first aspect implementation of the third aspect is implemented in accordance with step 206 of method 200.

In a fifth implementation form of the computing device according to the third aspect as such or any preceding implementation form of the third aspect, each parameter set in the parameter space is a categorical, a discrete, or a continuous type of parameter. Iteratively selecting the unique parameter set from the parameter space comprises selecting values based on the parameter type. For example, the fifth implementation of the third aspect is implemented as step 210 of method 200.

What is claimed is:

1. A computing device to determine an optimal configuration of a benchmark program, the computing device comprising:

a non-transitory computer-readable storage media configured to store programming instructions; and a processor coupled to the non-transitory computer-readable storage media, wherein the programming instructions, when executed by the processor, cause the processor to:

iteratively select a unique parameter set from a parameter space, each parameter set corresponding to a unique configuration of the benchmark program, run the benchmark program as configured for each parameter set a plurality of times, wherein a number of runs for each parameter set is adaptively determined based on a stability heuristic comprising calculating a statistical measure of variability across results from the multiple runs and determining that stability is achieved in response to the statistical measure falling below a predetermined threshold, and wherein, in response to stability not being achieved within a predetermined duration for a given parameter set, the given parameter set is determined to be unstable and excluded from being in an optimal parameter set, determine an evaluation score for each parameter set from one or more runs using an evaluation heuristic, record the optimal parameter set having a best evaluation score, and configure the benchmark program based on the optimal parameter set.

2. The computing device of claim 1, wherein running the benchmark program as configured for each parameter set comprises determining the number of runs for each parameter set based on the stability heuristic and a predetermined number of runs, a predetermined duration for the one or more runs, or a combination thereof.

3. The computing device of claim 2, wherein the stability heuristic is based on a comparison of a normalized standard error of the mean of results for one or more runs to a threshold, a comparison of a distribution of results for one or more runs to an expected analytical distribution, a comparison of the distribution of results for one or more runs to an empirical distribution, determining that N % of benchmark runs are at least M % as fast as a baseline, determining a termination point based, or a combination thereof.

4. The computing device of claim 1, wherein iteratively selecting the unique parameter set from the parameter space comprises selecting the unique parameter set using an exploration heuristic, the exploration heuristic being a full grid search, a random search, a binary search, an evolutionary computational search, a genetic algorithm search, or a simulated annealing search.

5. The computing device of claim 1, wherein the evaluation score is based on a shortest run time for each parameter set for the one or more runs, based on a highest desirability metric, based on a highest kurtosis metric, based on a highest inverse Sharpe ratio metric, or a combination thereof.

6. The computing device of claim 1, wherein each parameter set in the parameter space is a categorical, a discrete, or a continuous type of parameter, and wherein iteratively selecting the unique parameter set from the parameter space comprises selecting values based on the parameter type.

7. A computer-implemented method to determine an optimal configuration of a benchmark program, the method comprising:

iteratively selecting, by a computer system, a unique parameter set from a parameter space, each parameter set corresponding to a unique configuration of the benchmark program;

running, by the computer system, the benchmark program as configured for each parameter, wherein a number of runs for each parameter set is adaptively determined based on a stability heuristic comprising calculating a statistical measure of variability across results from the multiple runs and determining that stability is achieved in response to the statistical measure falling below a predetermined threshold, and wherein, in response to stability not being achieved within a predetermined duration for a given parameter set, the given parameter set is determined to be unstable and excluded from being in an optimal parameter set;

determining, by the computer system, an evaluation score for each parameter set from one or more runs using an evaluation heuristic;

recording, by the computer system, the optimal parameter set having a best evaluation score; and configuring, by the computer system, the benchmark program based on the optimal parameter set.

8. The computer-implemented method of claim 7, wherein running the benchmark program as configured for each parameter set comprises determining the number of runs for each parameter set based on the stability heuristic and a predetermined number of runs, a predetermined duration for the one or more runs, or a combination thereof.

9. The computer-implemented method of claim 8, wherein the stability heuristic is based on a comparison of a normalized standard error of the mean of results for one or more runs to a threshold, a comparison of a distribution of results for one or more runs to an expected analytical distribution, a comparison of the distribution of results for one or more runs to an empirical distribution, determining that N % of benchmark runs are at least M % as fast as a baseline, determining a termination point, or a combination thereof.

10. The computer-implemented method of claim 7, wherein iteratively selecting the unique parameter set from the parameter space comprises selecting the unique parameter set using an exploration heuristic, the exploration heuristic being a full grid search, a random search, a binary search, an evolutionary computational search, a genetic algorithm search, or a simulated annealing search.

11. The computer-implemented method of claim 10, further comprising applying regularization, gradient descent, or a combination thereof, to the exploration heuristic to select the unique parameter set for each iteration.

12. The computer-implemented method of claim 7, wherein the evaluation score is based on a shortest run time for each parameter set for the one or more runs, based on a highest desirability metric, based on a highest kurtosis metric, based on a highest inverse Sharpe ratio metric, or a combination thereof.

13. The computer-implemented method of claim 7, wherein each parameter set in the parameter space is a categorical, a discrete, or a continuous type of parameter, and wherein iteratively selecting the unique parameter set from the parameter space comprises selecting values based on the parameter type.

14. A non-transitory computer-readable media storing computer instructions to determine an optimal configuration of a benchmark program that, when executed by a processor, causes the processor to:

iteratively select a unique parameter set from a parameter space, each parameter set corresponding to a unique configuration of the benchmark program;

run the benchmark program as configured for each parameter, wherein a number of runs for each parameter set is adaptively determined based on a stability heuristic comprising calculating a statistical measure of variability across results from the multiple runs and determining that stability is achieved in response to the statistical measure falling below a predetermined threshold, and wherein, in response to stability not being achieved within a predetermined duration for a given parameter set, the given parameter set is determined to be unstable and excluded from being in an optimal parameter set;

determine an evaluation score for each parameter set from one or more runs using an evaluation heuristic;

record the optimal parameter set having a best evaluation score; and configure the benchmark program based on the optimal parameter set.

15. The non-transitory computer-readable media of claim 14, wherein running the benchmark program as configured for each parameter set comprises determining the number of runs for each parameter set based on the stability heuristic and a predetermined number of runs, a predetermined duration for the one or more runs, or a combination thereof.

16. The non-transitory computer-readable media of claim 15, wherein the stability heuristic is based on a comparison of a normalized standard error of the mean of results for one or more runs to a threshold, a comparison of a distribution of results for one or more runs to an expected analytical distribution, a comparison of the distribution of results for one or more runs to an empirical distribution, determining that N % of benchmark runs are at least M % as fast as a baseline, determining a termination point, or a combination thereof.

17. The non-transitory computer-readable media of claim 14, wherein iteratively selecting the unique parameter set from the parameter space comprises selecting the unique parameter set using an exploration heuristic, the exploration heuristic being a full grid search, a random search, a binary search, an evolutionary computational search, a genetic algorithm search, or a simulated annealing search.

18. The non-transitory computer-readable media of claim 17, wherein the computer instructions, when executed by the processor, cause the processor to apply regularization, gradient descent, or a combination thereof, to the exploration heuristic to select the unique parameter set for each iteration.

19. The non-transitory computer-readable media of claim 14, wherein the evaluation score is based on a shortest run time for each parameter set for the one or more runs, based on a highest desirability metric, based on a highest kurtosis metric, based on a highest inverse Sharpe ratio metric, or a combination thereof.

20. The non-transitory computer-readable media of claim 14, wherein each parameter set in the parameter space is a categorical, a discrete, or a continuous type of parameter, and wherein iteratively selecting the unique parameter set from the parameter space comprises selecting values based on the parameter type.

* * * * *